United States Patent
Trueba (10) Patent No.: US 7,509,676 B2
(45) Date of Patent: Mar. 24, 2009

(54) SYSTEM AND METHOD FOR RESTRICTING ACCESS TO AN ENTERPRISE NETWORK

(75) Inventor: Luis Ruben Zapien Trueba, Leon (MX)

(73) Assignee: Electronic Data Systems Corporation, Plano, TX (US)

( * ) Notice: Subject to any disclaimer, the term of this patent is extended or adjusted under 35 U.S.C. 154(b) by 775 days.

(21) Appl. No.: 10/909,258

(22) Filed: Jul. 30, 2004

(65) Prior Publication Data

US 2006/0026686 A1     Feb. 2, 2006

(51) Int. Cl.
  *G06F 11/32*     (2006.01)
  *G08B 23/00*     (2006.01)
  *G06F 15/16*     (2006.01)

(52) U.S. Cl. ............... 726/22; 726/23; 726/24; 726/25; 713/188; 709/225

(58) Field of Classification Search ........... 713/188; 726/22, 23, 24, 25; 709/225
See application file for complete search history.

(56) References Cited

U.S. PATENT DOCUMENTS

| | | | | |
|---|---|---|---|---|
| 5,845,077 | A | 12/1998 | Fawcett | 395/200.51 |
| 5,949,877 | A * | 9/1999 | Traw et al. | 713/171 |
| 6,058,372 | A | 5/2000 | Sweet et al. | 705/16 |
| 2001/0020272 | A1* | 9/2001 | Le Pennec et al. | 713/200 |
| 2002/0007456 | A1* | 1/2002 | Peinado et al. | 713/164 |
| 2003/0065926 | A1 | 4/2003 | Schultz et al. | 713/188 |
| 2003/0126472 | A1 | 7/2003 | Banzhof | 713/201 |
| 2003/0163382 | A1* | 8/2003 | Stefanik et al. | 705/26 |
| 2004/0006704 | A1 | 1/2004 | Dahlstrom et al. | 713/200 |
| 2004/0064726 | A1 | 4/2004 | Girouard | 713/201 |
| 2004/0237079 | A1* | 11/2004 | Cox et al. | 717/168 |
| 2004/0249975 | A1* | 12/2004 | Tuck et al. | 709/245 |
| 2005/0030929 | A1* | 2/2005 | Swier et al. | 370/338 |
| 2005/0097199 | A1* | 5/2005 | Woodard et al. | 709/223 |
| 2006/0026283 | A1 | 2/2006 | Trueba | 709/225 |

FOREIGN PATENT DOCUMENTS

WO    WO 02/03178 A2    5/2001

OTHER PUBLICATIONS

Sarrel, "Network Security: Know Your Weaknesses," PC Magazine, pp. 1-12, Dec. 30, 2003.
"Experts in Strategic Security, FS1000, Foundstone FS1000 Appliance," Foundstone, Inc., 2 pages, 2003.
PCT, "Written Opinion of the International Searching Authority," PCT/US2005/021175, 6 pages, Jun. 15, 2005.
Eustice et al., "Securing Nomads: The Case for Quarantine, Examination, and Decontamination," XP-002369924, pp. 123-128, 2003.
PCT Notification of Transmittal of the International Search Report and the Written Opinion of the International Searching Authority, PCT/US2005/024629, 12 pages, Mar. 20, 2006.

* cited by examiner

*Primary Examiner*—Kambiz Zand
*Assistant Examiner*—Michael J Simitoski
(74) *Attorney, Agent, or Firm*—Baker Botts L.L.P.

(57) ABSTRACT

One aspect of the invention is a method for restricting access to an enterprise network that includes determining whether a computer that may be connected to an enterprise network on a temporary basis has one or more malicious code items where the computer accompanies a visitor to a facility associated with the enterprise network. An indication is provided to a human if it is determined that the computer has one or more malicious code items.

74 Claims, 5 Drawing Sheets

SYSTEM AND METHOD FOR RESTRICTING ACCESS TO AN ENTERPRISE NETWORK

TECHNICAL FIELD OF THE INVENTION

This invention relates generally to network communications systems and more particularly to a system and method for restricting access to an enterprise network.

BACKGROUND OF THE INVENTION

A computer contaminated with a worm, virus, or other malicious code can spread the contamination to other computing systems and networks without the knowledge or intent of the computer owner. For example, when a visitor to an enterprise facility brings in a computer that has a contaminated file or system and uses that computer to access an enterprise network, the worms and/or viruses contaminating the computer may be spread to other network elements in the enterprise network. Although virus scans and other security processes may be performed periodically to help restore the computer and to safeguard networks associated with the computer from further damage, such measures are generally remedial in nature. A great deal of damage may be done to the contaminated computer and to networks associated with the computer, however, before the presence of the malicious code is detected and the source of the contamination identified for remedial clean-up.

SUMMARY OF THE INVENTION

One aspect of the invention is a method for restricting access to an enterprise network that includes determining whether a computer that may be connected to an enterprise network on a temporary basis has one or more malicious code items where the computer accompanies a visitor to a facility associated with the enterprise network. An indication is provided to a human if it is determined that the computer has one or more malicious code items.

The invention has several important technical advantages. Various embodiments of the invention may have none, one, some, or all of these advantages without departing from the scope of the invention. In particular embodiments, the invention allows for the selective restriction of access to an enterprise network. Specifically, the invention allows for the detection of malicious code in computers external to the enterprise network before those computers are allowed access to the enterprise network. Accordingly, computer equipment belonging to a visitor of an enterprise facility may be scanned for malicious code items before the visitor is given access to the enterprise network. Therefore, access to the enterprise network may be granted or denied on a case-by-case basis.

In other embodiments, a stand-alone system may be provided to perform antivirus scans, security patch analyses, security practice assessments, or other security verification tests on a computer. In particular embodiments, a kiosk may be located in an airport, internet cafe, shopping center, retail store, or any other public forum. The kiosk may provide the general public with easy and comprehensive access to security verification tests. Thus, members of the general public may be able to identify, diagnose, and remedy worms, viruses, and other malicious code items on their computers. As a result, the general health of the computer may be more easily maintained.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1-5 of the drawings, like numerals being used for like and corresponding parts of the various drawings.

Figure 1:
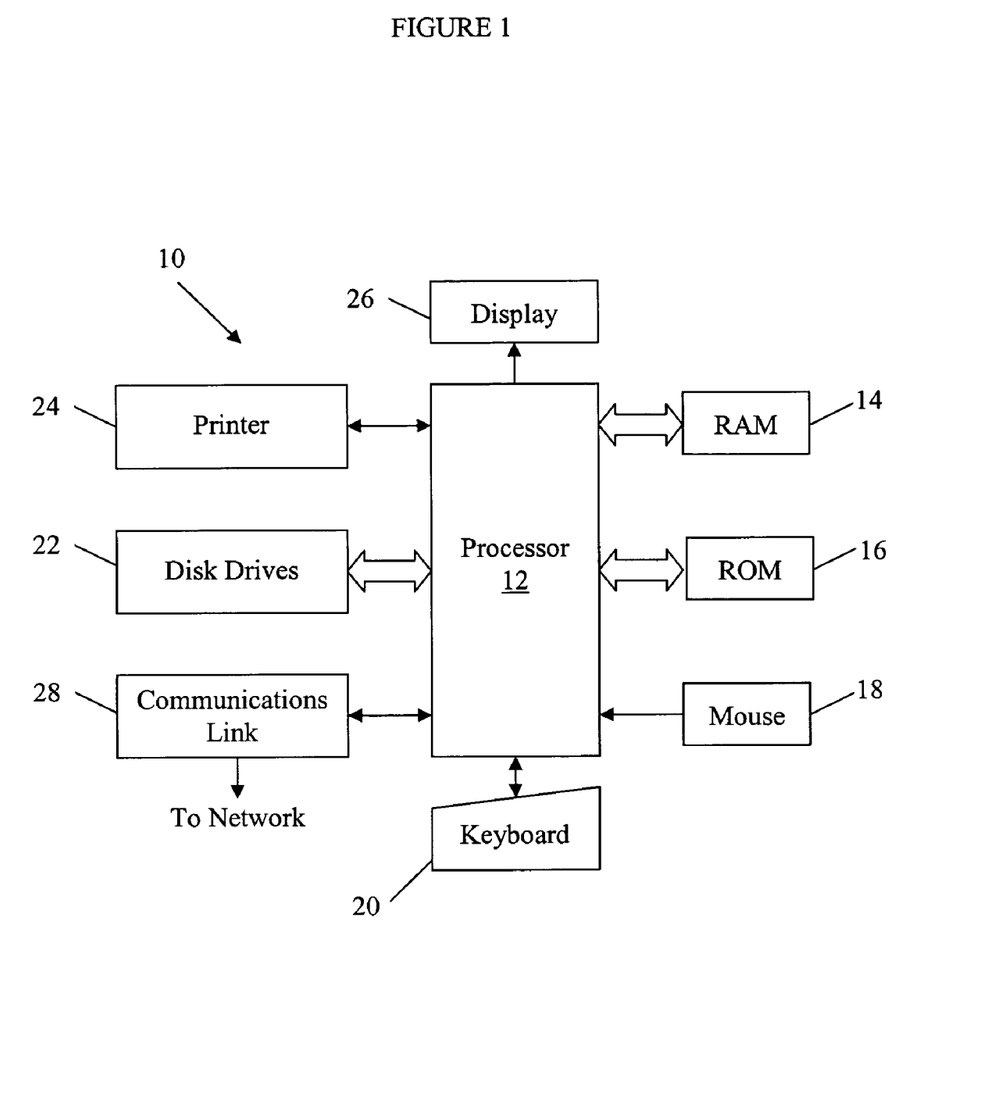
FIG. 1 illustrates a block diagram of a general purpose computer that may be used in accordance with the present invention.

FIG. 1 illustrates a general purpose computer 10 that may be used for restricting access to an enterprise network in accordance with the present invention. In certain embodiments, general purpose computer 10 may comprise a portion of an enterprise network and may be used to execute applications and software to access various components of the enterprise network. In certain embodiments, general purpose computer 10 may comprise a computer that is at least partially isolated from an enterprise network and operates to perform various tests and checks on visiting computers to selectively restrict access to the enterprise network. In particular embodiments, general purpose computer 10 may operate to diagnose and remedy corrupted files and systems associated with other computers 10.

General purpose computer 10 may be adapted to execute any of the well known MS-DOS, PC-DOS, OS2, UNIX, MAC-OS and Windows operating systems or other operating systems. As used in this document, operating system may refer to the local operating system for computer 10, a network operating system, or a combination of both. General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD ROM drives, or magnetic tape drives. Disk drive 22 may also include a network disk housed in a server within the enterprise network. Although this embodiment employs a plurality of disk drives 22, a single disk drive 22 could be used without departing from the scope of the invention. FIG. 1 only provides one example of a computer that may be used with the invention. The invention could be used with computers other than general purpose computers as well as general purpose computers without conventional operating systems.

Figure 2:
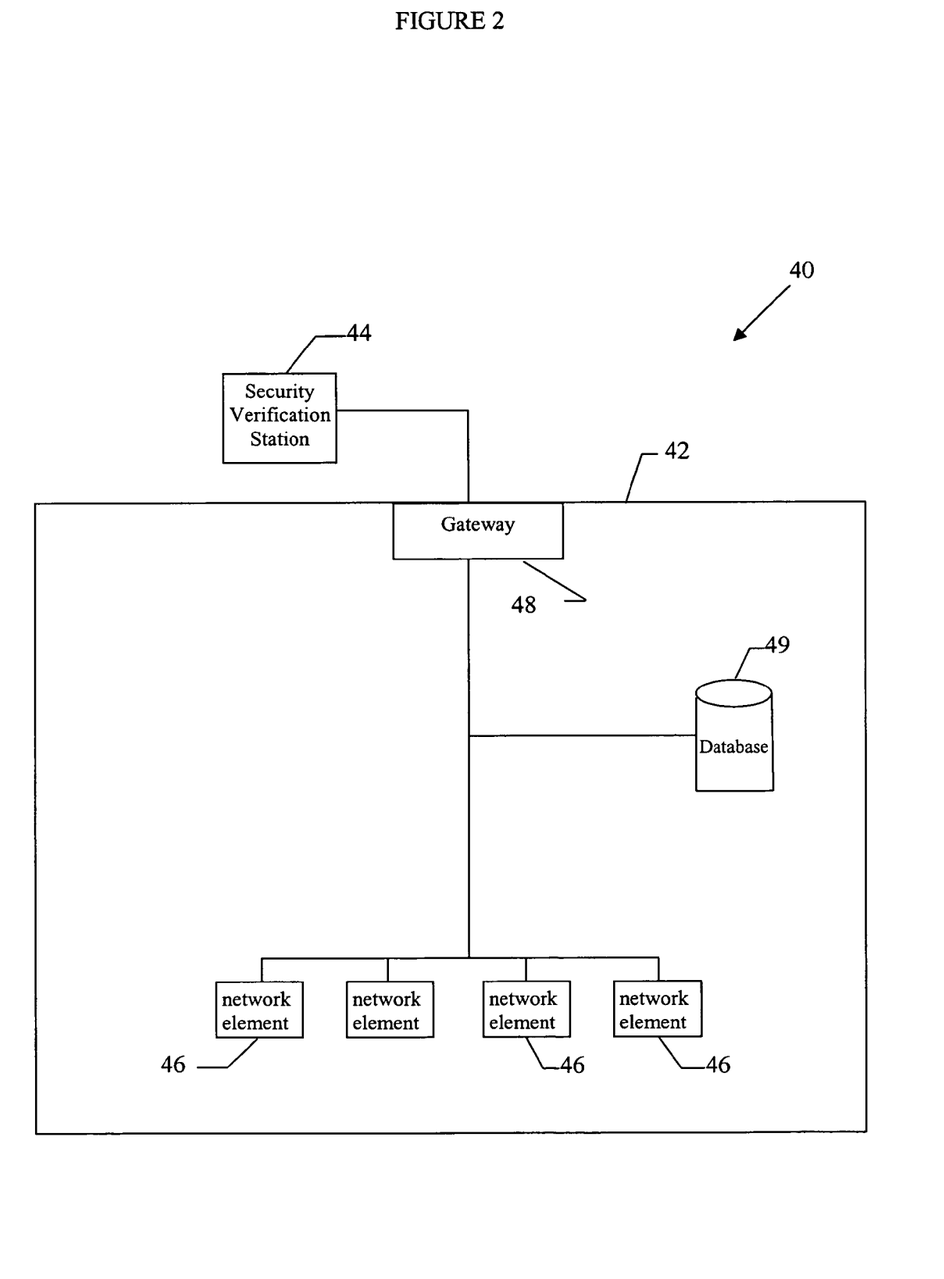
FIG. 2 illustrates a block diagram of an example system that may be used for restricting access to an enterprise network in accordance with the present invention.

FIG. 2 illustrates a block diagram of an example system 40 that may be used for restricting access to an enterprise network 42 in accordance with the present invention. System 40 operates to perform one or more checks or tests on a visiting computer before granting the visiting computer permission to access enterprise network 42. As will be described in more detail below, a security verification station 44 may be coupled to or otherwise associated with enterprise network 42. The security verification station 42 may include software and functionality for performing antivirus scans, security patch analyses, security practices assessments, and other security verification tests on a visiting computer. The security verification tests may be performed to determine whether a malicious code is associated with the computer. Additionally or alternatively, the security verification tests may be performed to determine whether the computer's programs or configurations leave the computer vulnerable by permitting malicious code execution. The malicious code may include any viruses, worms, denial of service attacks, or other code designed to cause damage to a computer or network system or otherwise interfere with the normal operations of a computer or network system. Because security verification station 44 performs the scans and security patch analyses before a visiting computer is allowed to access enterprise network 42, access to enterprise network 42 may be denied to contaminated or vulnerable equipment. Alternatively, remedial measures may be taken to prevent the spreading of the contamination or to change program configurations to fix identified vulnerabilities. Thus, access to enterprise network 42 may be selectively granted to only those visiting computers that are free of vulnerabilities and contaminated systems and files.

In the illustrated example, enterprise network 42 comprises at least one network element 46, a gateway server 48, and a database 49. Enterprise network 42 may have, however, more or less components (of these or differing types) without departing from the scope of the invention. Network elements 46 may include any devices that provide network services, provide access to network services, or provide a combination of these or other functionalities. For example, in particular embodiments, a network element 46 may comprise a computer, printer, fax machine, copier, or other network device. In other embodiments, a network element 46 may comprise a wireless router, port, or other communication device that may be used to establish communication with network computers and/or visiting computers to provide access to enterprise network 42.

Gateway server 48 may include a node on enterprise network 48 that serves as an access point to enterprise network 48. Gateway server 48 may operate to route communications and other traffic to, from, and within enterprise network 42. Gateway server 48 may also act as a proxy server and a firewall. In certain embodiments, gateway server 48 acts as a firewall between security verification station 44 and enterprise network 42. Thus, gateway server 48 may allow security verification station 44 selective access to enterprise network 42. Accordingly, gateway server 48 may include the hardware and/or software for preventing unauthorized access to or from enterprise network 42. In particular embodiments, gateway server 48 may be configured substantially like computer 10 described above with regard to FIG. 1. Alternatively, gateway server 50 may include any general purpose computer with the appropriate applications and functionality for managing communications traversing enterprise network 42. If gateway server 48 is excluded from system 40, the functions described as pertaining to gateway server 48 may be performed by other servers or clients within enterprise network 42.

As will be described in more detail below, security verification station 44 may include hardware appropriate for coupling to or communicating with a visiting computer. Additionally, security verification station 44 may include the appropriate software and functionality for the performance of antivirus scans, security practice assessments, and/or security patch analyses. Where security verification station comprises a computer, the computer may be configured substantially like computer 10 described above with regard to FIG. 1 or may include any other general purpose computer.

Security verification station 44 includes a communication module for communicating with a visiting computer. In particular embodiments, the communication module includes a port and/or cord for physically coupling security verification station 44 with a corresponding port of a visiting computer. In other embodiments, the communication module may include a wireless router (or other wireless connection) for wirelessly communicating with the visiting computer. Once the visiting computer is coupled to or otherwise in communication with security verification station 44, various security processes may be performed to determine whether the files and/or systems of the visiting computer are contaminated with one or more malicious code items or include the most recent software upgrades to prevent contamination by malicious code items.

For example, a visitor to a facility associated with enterprise network 42 may gain access to restricted areas of the facility through a reception area where the visitor may be required to identify himself and any computer equipment that the visitor may have with him. In some enterprise facilities, the visitor may be required to check-in with security or other enterprise personnel before being given access to the restricted areas. In particular embodiments, security or other enterprise personnel may direct the visitor to security verification station 44. Alternatively, posted signs may direct the visitor to security verification station 44. The visitor may then couple a port of the visitor's computer to security verification station 44 using an appropriate cord and adapter (or connect using a wireless connection). In particular embodiments, the coupling of the visiting computer to security verification station 44 may initiate the security verification process.

The security verification process may include the performance of one or more antivirus scans (which may scan for malicious code in addition to viruses) to identify any corrupted files or systems on the visiting computer. For example, security verification station 44 may include a computer with the latest and most up-to-date antivirus software for searching the hard drive of the visiting computer for malicious code items. A computer having malicious code items may be said to be corrupted, and a corrupted computer may be denied access to enterprise network 42. In particular embodiments, security verification station 44 may use remedial measures to remove or clean the corrupted files or systems. In particular embodiments, security verification station 44 may perform the antivirus scan using software such as Viruscan offered by McAfee Associates, F-prot from Frisk Software, Thunderbyte from Thunderbyte B.B., or some combination of these or other network security systems.

In certain embodiments, the security verification process may also include the performance of one or more security patch analyses to verify that the systems on the visitor's computer have been installed with the latest software upgrades or security patches. For example, security verification station 44 may include software that scans and analyzes the visitor's computer for specific information about the version of the software supporting the operating system or other systems installed on the visitor's computer. In particular embodiments, the security patch analyses may include querying the computer's operating system for version information. Where, for example, the operating system of the computer accepts commands eliciting information from the operating system, security verification station 44 may request a version identifier from the visitor's computer. The version identifier may be associated with the software supporting the operating system. Alternatively or additionally, security verification station 44 may request a listing of the patches currently installed on the visitor's computer. In response to the query or request, the operating system may search the system's files for flags or search a registry of upgraded patches already stored on the visitor's computer.

Additionally or alternatively, security verification station 44 may communicate commands to the operating system to request a time stamp or date. The time stamp or date may also be associated with the software supporting the operating system.

In particular embodiments, security verification station 44 may perform the security patch analyses using hardware and software such as Retina Network Security Scanner offered by eEye Digital Security, FGI LANguard Network Security Scanner 3.3 offered by GFI Software Limited, MegaPing offered by Magneto Software, Incorporated, Nessus offered by Renaud Deraison, of Foundstone FS1000 Appliance offered by Foundstone Strategic Security, or some combination these or other network security systems. A computer found to have a corrupted (or less than up-to-date) operating system may be denied access to enterprise network 42. In particular embodiments, a service patch may be applied to the operating system to fix the program. After receiving the upgraded patch, the visiting computer may be allowed to access enterprise network 42.

In particular embodiments, the security verification tests may also include a security practices assessment to determine the security practices utilized by the visitor's computer. To this end, security verification station 44 may query the visitor's computer to determine whether the computer employs any unsafe security practices. For example, security verification station 44 may test or query the visitor's computer to determine if the operating system has weak access control policies. For example, security verification station 44 may test the visitor's computer to determine if the computer accepts blank or other easily hacked passwords. As another example, security verification station 44 may query the operating system to determine if the computer has any open NetBIOS ports for file and printer sharing. As still another example, a determination may be made as whether the computer has been used to run rogue Web servers or to participate in peer-to-peer file-sharing. Other unsafe security practices may include improper configurations of applications stored on the visitor's computer, which can leave a computer unprotected. For example, Microsoft Exchange's default configuration once left the server as an open SMTP relay, which was exploitable by spammers. The unsafe practices described above, however, are just a few examples of the types practices and policies that a security practices assessment might be used to identify. The security practices assessment may include the identification of any other known unsafe practices that endanger or otherwise leave vulnerable the computer's operating system and other computer's on a common network.

Based on the results of the security verification tests performed, a visiting computer may be tagged, labeled, or otherwise appropriately identified as being clean or corrupted. For example, in particular embodiments, a label may be affixed to the computer to indicate to enterprise employees, administrators, and security personnel that the visiting computer had none of the malicious code items tested for. Additionally or alternatively, an identifier may be assigned to or associated with the visiting computer. The identifier may also be used to indicate whether the visiting computer is free of malicious code and/or not susceptible to malicious code attacks. Additionally, the identifier may indicate to enterprise network 42 that the visiting computer includes the most recently available system updates. In particular embodiments, the identifier may comprise a hardware serial number associated with the computer. For example, the identifier may correspond with the MAC address assigned to the computer. In still other embodiments, the identifier may include a digital certificate provided to the computer. If the visiting computer is used to try to gain access to enterprise network 42 or network elements 46, enterprise network 42 may query the visiting computer for the digital signature associated with the visiting computer when deciding whether to allow the visiting computer to access the enterprise network 42.

Where security verification station 44 is coupled to enterprise network 42 through a private or public connection, security verification station 44 may communicate the identifier to enterprise network 42. The identifier assigned to the visiting computer may be stored in a database 49 where it may be accessed to authenticate the visiting computer if the visiting computer is used to try to gain access to enterprise network 42. For example, if the visitor associated with a verified computer connects to enterprise network 42 to send a print job to a network element 46, enterprise network 42 may access database 49 to verify that an identifier is associated with the visiting computer. Alternatively, enterprise network 42 may compare the identifier stored on the computer alternatively with the identifier stored in database 49. The visiting computer may be given access to enterprise network 42 or denied access to enterprise network 42 as is appropriate based on the identifier. Alternatively, database 49 could be omitted and an identifier verified by a different means. For example, where a digital certificate is used, the certificate could be analyzed to determine whether it is valid or not.

Figure 3:
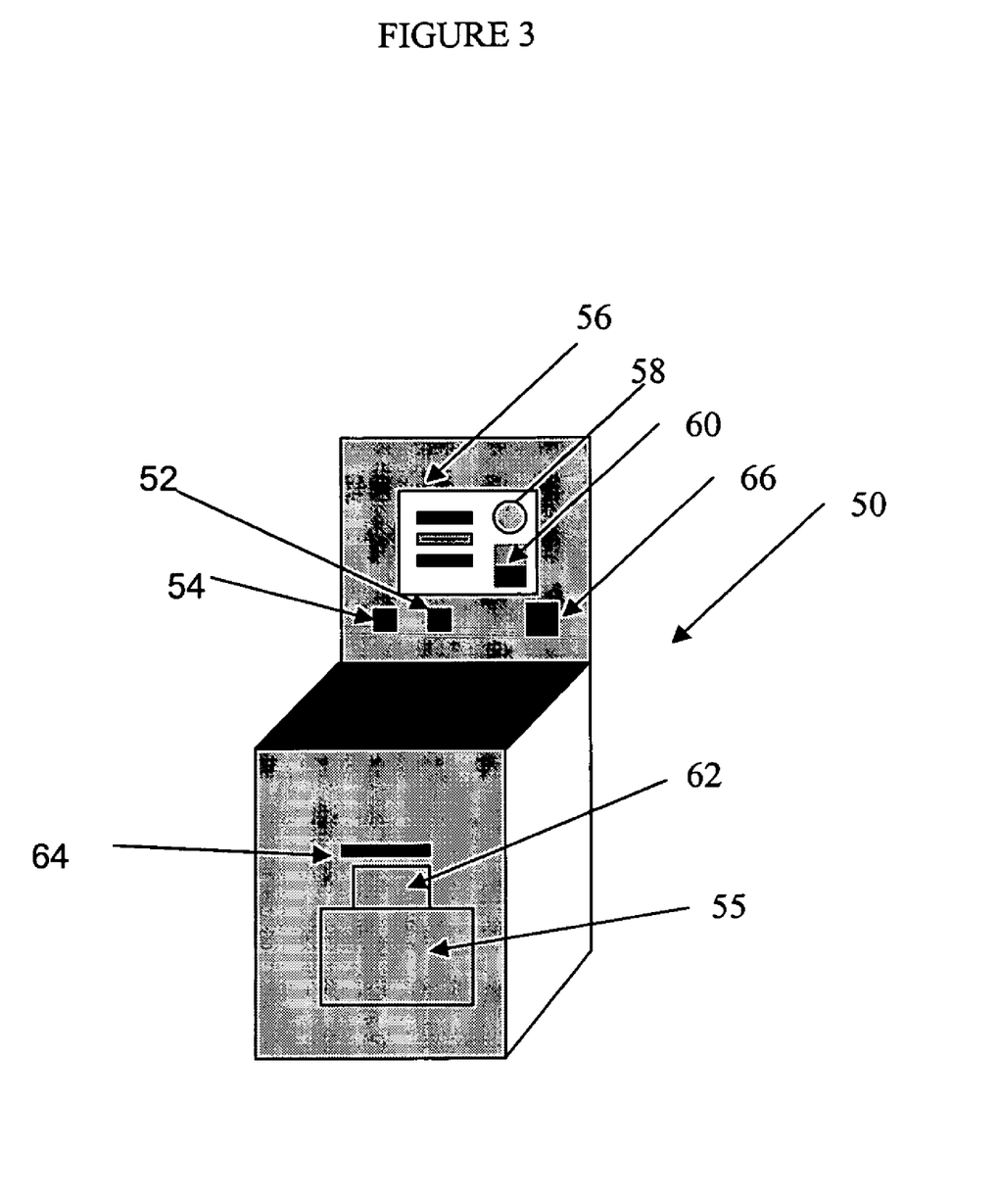
FIG. 3 illustrates an example kiosk for performing security verification tests on a computer in accordance with the present invention.

As described above, security verification station 44 may be located at an access point to an enterprise facility. In particular embodiments, security verification station 44 may comprise a kiosk located at an access point, which may include a reception or security area. FIG. 3 illustrates an example kiosk 50 for performing security verification tests on a computer in accordance with the present invention. Before a visitor to an enterprise facility is allowed to enter the restricted area (or before the visitor can connect his computer to enterprise network 42), the visitor may be directed to use kiosk 50 to perform one or more security verification tests as described above.

Kiosk 50 includes a communication module 52 that may be used to communicate with a visiting computer. In particular embodiments, communication module 52 includes a port that may be used to couple to an associated port of a visiting computer. In other embodiments, communication module 52 may include a wireless router or other wireless access point for wirelessly communicating with a visiting computer. For example, communication module may include an antenna through which a communication path may be established with the computer. To perform the security verification tests on the visitor's computer, the visitor may be required to boot up or otherwise power on the computer. To this end, kiosk 50 may also include an outlet 54 (or cord) for providing electrical current to the visiting computer. Accordingly, a port or cord associated with the visiting computer may be coupled to outlet 54 so that the visiting computer may be powered up for the security verification tests.

In particular embodiments, kiosk 50 may also include a processor 55 with the software and/or hardware necessary for performing one or more security verification tests. The security verification tests may be substantially like those described above with regard to FIG. 1. For example, kiosk 50 may perform one or more antivirus scans, security patch analyses, and/or security practice assessments on a visiting computer. Where kiosk 50 includes the software and hardware for performing the security verification tests, kiosk 50 may comprise a stand alone system that operates independently of enterprise network 42. The isolation of kiosk 50 from enterprise network 42 may further prevent the spreading of malicious code to enterprise network 42 from the visiting computer being tested by kiosk 50.

In particular embodiments, kiosk 50 may be coupled to enterprise network 42 through gateway server 48. Kiosk 50 may have selective access to enterprise network 42 through gateway server 48 over a direct connection, a private network, or a public network, such as the Internet. In such a system, the software for performing the antivirus scans, security patch analyses, security practices assessments, or other security verification tests may be stored on kiosk 50 or on enterprise network 42. The software may be stored in database 49 or another server or storage unit in enterprise network 42. Accordingly, for the purposes of performing the security verification tests on a visiting computer, kiosk 50 may be given limited access to enterprise network 42. To prevent the spreading of malicious code from the visiting computer being tested, however, kiosk 50 may be at least partially isolated from enterprise network 42. For example, gateway server 44 may allow selective communications between kiosk 50 and enterprise network 42. Where kiosk 50 associates an identifier with a visiting computer after the tests have been performed, kiosk 50 may, in some embodiments, communicate the identifier to enterprise network 42. The identifier may be stored in database 49 or another server or storage unit in enterprise network 42 and may be referenced by enterprise network 42 to determine whether to allow the visiting computer to access enterprise network 42. In other embodiments, the identifier may not be communicated because the information required to verify the identifier is contained with the identifier or is part of the identifier.

Kiosk 50 may also includes a display 56 to provide information to the visitor as the various security verification tests are being performed on the visitor's computer. For example, as illustrated, kiosk 50 includes a progress display 58 and a pass/fail indicator 60. Progress display 58 indicates to the visitor that kiosk 50 is in the process of performing security verification tests on the visitor's computer. For example, progress display 58 may include a light that is lit when the security verification tests are being performed. After the tests are completed, the light may turn off to indicate to the user that the computer may be safely removed from kiosk 50. As a result, the visitor may be discouraged from prematurely removing the computer from kiosk 50. Thus, damage to the computer and kiosk 50 may be prevented. Display 56 may also include a pass/fail indicator 60 to indicate to the user that the security verification tests are completed. Pass/fail indicator 60 may also indicate to the user whether the security verification tests discovered any corrupted files, corrupted systems, or other security vulnerabilities on the visitor's computer. For example, pass/fail indicator 60 may be illuminated with a red light when malicious code items are identified on the tested computer. Similarly, pass/fail indicator 60 may be illuminated green when kiosk 50 does not detect any malicious code on the computer. Thus, pass/fail indicator 60 may indicate to the user that one or more files or systems are corrupted or, alternatively, that the computer is clean.

In addition to or as an alternate to progress display 58 and pass/fail indicator 60, kiosk 50 may include a graphical interface display that may be used to present options or messages to the visitor. As still another alternative, kiosk 50 may communicate messages to the visitor's computer and the messages may be displayed directly on the graphical interface screen of the computer being tested.

In the illustrated embodiment, kiosk 50 also includes a printing module 62. Printing module 62 may be operable to generate a printed label that may be used to identify the tested computer and to indicate the result of the security verification tests to enterprise personnel. The printed label may be provided to the visitor or to security personnel operating kiosk 50 through a slot 64. For example, if it is determined from the antivirus scans, security patch analyses, security practices assessments, or other security verification tests that the tested computer is free of malicious code items and is not vulnerable to malicious code attacks, a pass label may be printed and supplied to the user of kiosk 50 through slot 64. The pass label may be adhered to the visitor or the visitor's computer to indicate to enterprise employees, administrators, and security personnel that the computer is clean and may be granted access to enterprise network 42 and network elements 46 within enterprise network 42.

On the other hand, printer module 62 may also operate to generate a fail label where it is determined that the tested computer is not free of malicious worms and viruses or is vulnerable to malicious code execution. The fail label may also be provided to the visitor or security personnel operating kiosk 50 through slot 64. The printed fail label may be applied to the visitor or the visitor's computer to indicate to enterprise employees, administrators, and security personnel that the computer is not clean and should not be granted access to enterprise network 42.

In particular embodiments, the fail label may be adapted to be adhered to one or more ports of the tested computer. The label may be used to cover the one or more ports of the visitor's computer to indicate to the visitor and to employees, administrators, and security personnel of enterprise network 42 that the ports should not be used. Where kiosk 50 is associated with a security or reception desk of an enterprise facility, security personnel may also take the computer from the visitor and hold the computer for safe keeping until the visitor is ready to leave the enterprise facility. Alternatively, the security personnel may receive notice from kiosk 50 that the visitor's computer has failed one or more security verification tests, and the security personnel may couple a plug, lock, or other physical impediment to the one or more ports of the visiting computer to prevent or deter the visitor from accessing enterprise network 42 once inside the facility.

The printing module 62 may also be separate from kiosk 50 without departing from the scope of the invention. For example, printing module 62 could be located behind a reception or security desk without departing from the scope of the invention.

In the illustrated embodiment, kiosk 50 also includes a billing module 66. As will be described in more detail below with regard to FIGS. 4 and 5, billing module 66 may be used to obtain and process payment information received from the user of kiosk 50 when the services offered by kiosk 50 are not free to the user. For example, in particular embodiments, kiosk 50 may offer remedial measures to the visitor of enterprise network 42 to fix or clean any corrupted files or systems identified on the visitor's computer before the visitor is granted access to enterprise network 42. Such remedial measures may include a software upgrade, the removal of corrupted files, the cleaning of corrupted files, or the application of required patches or upgrades. Before applying such remedial measures to the visitor's computer, however, billing module 66 may receive payment information from the visitor and authenticate the payment information where the payment information includes credit card information.

Although a kiosk is described for coupling to or communicating with the visiting computer, it is generally recognized that security verification station 44 may comprise any system for performing the described security verification tests. When security verification station 44 is used to safeguard an enterprise network 42, security verification station 44 may be incorporated into a security or reception desk. For example, security verification station 44 may merely comprise a port at the security or reception desk to which the visiting computer may be coupled. The port may be part of or coupled to a computer associated with the security or reception desk. As such, when a visitor enters an enterprise facility, security or other enterprise personnel may ask the visitor to couple the visitor's computer to the port at the security or reception desk. Alternatively, the security or other personnel may take the computer from the visitor to couple the computer to the port. In still other embodiments, where the computer and security verification station 44 are enabled for wireless communication, the security or reception desk may include a wireless router that may establish a communication path with the appropriate hardware of the visitor's computer without a physical coupling.

Although kiosk 50 is generally described as cooperating with an enterprise network 42 to safeguard the systems and files on enterprise network 42 from malicious code, it is generally recognized that kiosk 50 may operate independently of enterprise network 42. Accordingly, kiosk 50 may be sufficiently isolated from enterprise network 42 such that any corrupted files or systems discovered on the visitor's computer are also isolated from enterprise network 42. In other embodiments, kiosk 50 may have no association at all with an enterprise network. As such, kiosk 50 may include any stand-alone system for performing antivirus scans, security patch analyses, security practice assessments, or other security verification tests on a computer. For example, kiosk 50 may be located in an airport, internet cafe, shopping center, retail store, or any other public forum. Thus, and as will be described in more detail with regard to FIG. 5, kiosk 50 may be used to provide the general public with easy and comprehensive access to security verification tests. Thus, a user may include any member of the general public. As a result, any member of the general public may be able to identify, diagnose, and remedy malicious code items on the user's computer, and the general health of the individually owned computers may be more easily maintained.

Kiosk 50 may also be used to provide updates to software applications resident on a computer connected to kiosk 50. In a manner similar to operating system updates, kiosk 50 may check the computer to determine whether various software applications on the visitor's computer are a preferred version. The preferred version may be the most current version available or a version that is required by enterprise network 42 for security purposes. In other embodiments, the preferred version may be the version suggested or required by a provider of the software application. Where it is determined that the computer does not have the preferred version, at the option of the user, kiosk 50 may automatically update the software to the preferred version. Where a fee is charged for such an upgrade, kiosk 50 may collect the fee in the manner described herein.

Figure 4:
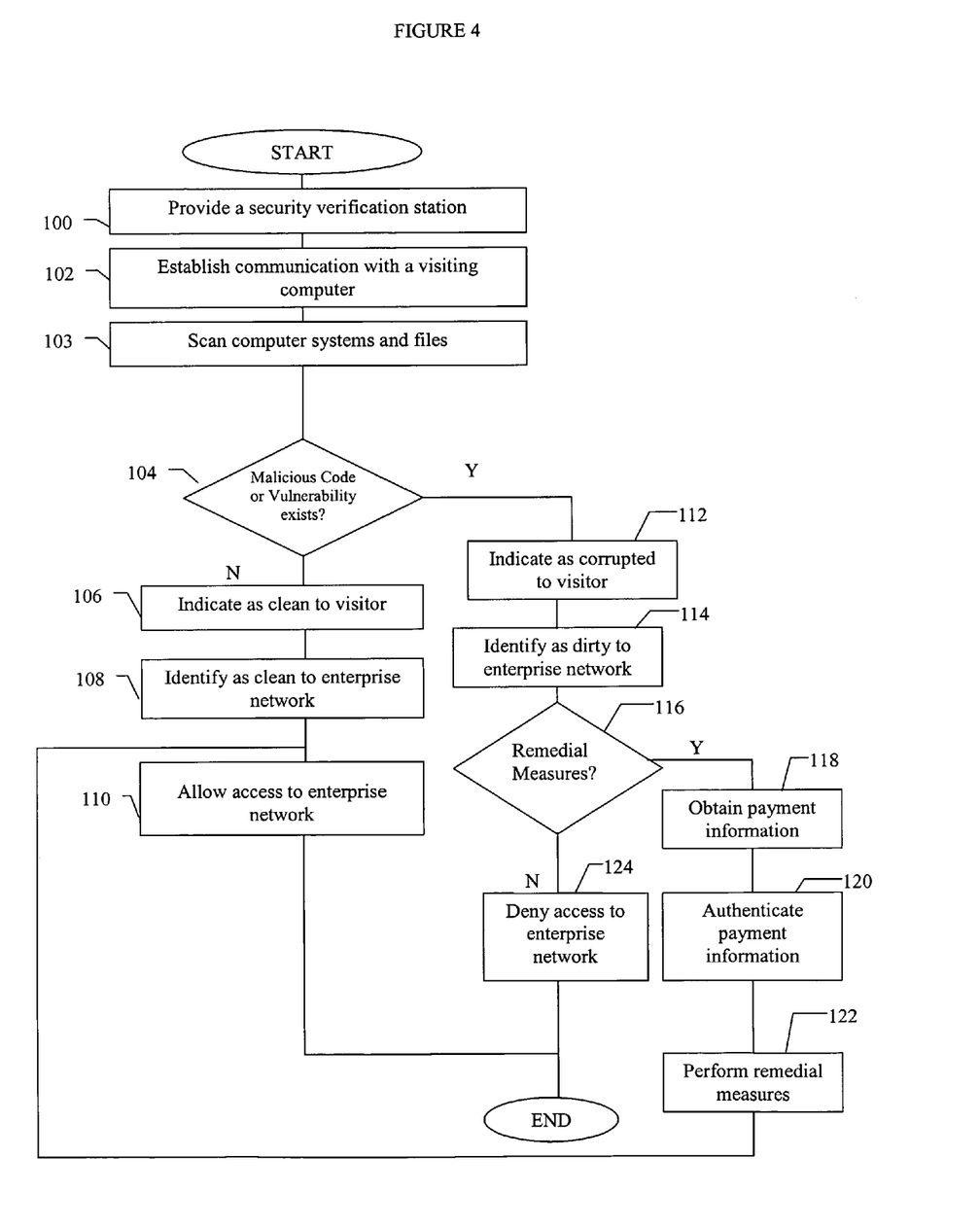
FIG. 4 illustrates a flow chart describing an example method for restricting access to an enterprise network in accordance with the present invention.

FIG. 4 illustrates a flow chart describing an example method for restricting access to enterprise network 42 in accordance with the present invention. The method described herein may be carried out using computer software, as can any or all of the processes described herein. That software may be executed by security verification station 44, gateway server 48, network element 46, kiosk 50, computer 10, or any other computer or combination of computers.

In step 100, a security verification station 44 is provided. In particular embodiments, the security verification station 44 may be provided at an enterprise access point. For example, security verification station 44 may comprise a kiosk 50 located at an entrance to an enterprise facility. The kiosk 50 may be proximate to a manned security or reception desk or may stand-alone independent of any security or reception desk. In other embodiments, security verification station 44 may comprise a computer associated with the manned security or reception desk.

As just one example, before entering an enterprise facility or a secured area within an enterprise facility, a visitor to the enterprise facility may be required to identify and check-in any computer equipment that the visitor desires to bring into the enterprise facility. Security personnel, reception personnel, or instructional signs may direct the visitor to security verification station 44 for performance of one or more security verification tests on the visitor's computer.

At step 102, communication between security verification station 44 and the visitor's computer is established. At step 104, a determination may be made as to whether the visitor's computer includes one or more malicious code items or whether the visitor's computer includes programs or configurations that leave the computer vulnerable to malicious code attacks by permitting execution of malicious code items. The determination may be made by performing an antivirus scan on the files stored on the visitor's computer to identify any files corrupted with viruses, worms or other malicious code. Additionally or alternatively, security patch analyses may be performed (in the manner described above) on the visitor's computer to determine whether the computer's operating and other systems are running using the most up to date code. In addition to determining whether the visitor's computer needs one or more patches, kiosk 50 may query the computer to determine whether the computer employs any unsafe security practices, as described above. The security practice assessment may be performed in conjunction with the security patch analyses or may be performed alternatively to the security patch analyses.

In the example described above, the security verification tests may be performed before the visitor is allowed to proceed into the restricted portions of the enterprise facility with the computer. Thus, the tests may deter the passing on of malicious code present on the visitor's computer to enterprise network 42. In another example, where kiosk 50 is operating independently of any enterprise network, the security verification tests may be performed to improve the general health of the tested computer and to prevent the spreading of malicious code to other computing devices and systems.

If it is determined that the tested computer does not have any of the malicious code items or vulnerabilities tested for, the method proceeds to step 106 where the fact that the computer is clean may be indicated to the visitor or other user. For example, where security verification station 44 comprises a kiosk 50, pass/fail indicator 60 may flash or display an appropriate color identifying that the tested computer does not contain worms, viruses, or other malicious code tested for. Pass/fail indicator 60 may also identify whether the tested computer has any programs or configurations that make the computer vulnerable to malicious code attacks. In particular embodiments, pass/fail indicator 60 may indicate whether or not the computer will be granted access to network elements 46 and other resources on an enterprise network 42. Where security verification station 44 is associated with a security or reception desk, personnel at the desk may inform the visitor of the results of the security verification tests.

Where security verification station 44 is associated with an enterprise network 42, the computer may be identified as clean or uncorrupted to enterprise network 42 at step 108. In particular embodiments, kiosk 50 or a printer associated with a security or reception desk proximate to security verification station 44 may print a label that may be adhered to the visitor's computer or to the visitor. The label may indicate to enterprise employees, administrators, and security personnel that the tested computer is authorized to access network elements 46 or other resources on enterprise network 42. Additionally or alternatively, an identifier may be assigned to or otherwise associated with the visitor's computer. In particular embodiments, the identifier may be stored in database 49 associated with enterprise network 42, or a digital certificate may be provided to the visitor's computer.

At step 110, the visitor may be given access to the enterprise facility. For example, the visitor may be allowed to take the tested computer into the enterprise facility or into restricted areas of the enterprise facility. Thereafter, if the visitor tries to access network elements 46, or other resources on enterprise network 42, access may be granted to the visitor and/or the tested computer. For example, the stored identifier may be referenced for determining that access to enterprise network 42 may be granted. Alternatively, enterprise network 42 may query the visitor's computer for a digital certificate stored on the computer.

If it is instead determined at step 104, however, that the tested computer is corrupted with malicious code or includes vulnerable programs, systems, or configurations, the method may proceed to step 112 where the fact that the computer includes corrupted files or systems may be indicated to the visitor. For example, where security verification station 44 includes a kiosk 50, pass/fail indicator 60 may flash or display an appropriate color identifying that a problem has been identified with the visitor's computer. Where security verification station 44 is associated with enterprise network 42, personnel at a security or reception desk may additionally or alternatively inform the visitor that a problem exists on the tested computer.

At step 114, the computer may be identified as including corrupted files or systems to enterprise network 42. For example, an identifier may be assigned to the visitor's computer, and the identifier stored in database 49 associated with enterprise network 42. If the visitor tries to access enterprise network 42 after being granted access to the enterprise facility, the stored identifier may be referenced for determining whether to allow the visitor's computer to access enterprise network 42. In certain other embodiments, security personnel may be notified of the corrupted nature of the visitor's computer and the computer may be held by the security personnel while the visitor is in the enterprise facility.

In certain embodiments, remedial measures may be offered to the visitor at step 116 (which could occur earlier or later). For example, kiosk 50 or security personnel associated with enterprise network 42 may offer a software upgrade or other fix to the visitor or user. The upgrade or other fix may include the removal of the corrupted files or the application of patches or upgrades to the computer's systems. In some embodiments, where security practices are examined, certain settings may be made such that security practices are acceptable to the operator of enterprise network 42. In either case, the visitor may be given the option of having these changes made. If the visitor or user desires remedial measures to be taken to repair the computer's files or systems, the method proceeds to step 118 where payment information may be obtained if the remedial measures are not free to the visitor or user. Accordingly, kiosk 50 or the security desk associated with the enterprise facility may have equipment for obtaining credit information or other payment information from the visitor. The equipment may also be capable of authenticating credit information received from the visitor or user. For example, the credit information may be authenticated at step 120 and remedial measures taken at step 122. The remedial measures taken may include the removal or cleaning of the one or more corrupted files from the visitor's computer. Alternatively or additionally, the remedial measures may include the patching of a corrupted system with clean code or the updating of software to a more current version. After the remedial measures are complete, the method may then continue at step 110 where the visiting computer is allowed access to enterprise network 42. The method may then terminate.

Although the steps of offering and applying remedial measures are described above, it is generally recognized that steps 116-122 may be omitted from the security verification process. Thus, the system described may be used merely to identify corrupted files and systems. Where such remedial measures are not offered or are not accepted by the visitor and the computer is identified as having a malicious code or virus or as being vulnerable to malicious codes or viruses, however, the visiting computer may be denied access (in any of the ways described above) to enterprise network 42 at step 124.

Figure 5:
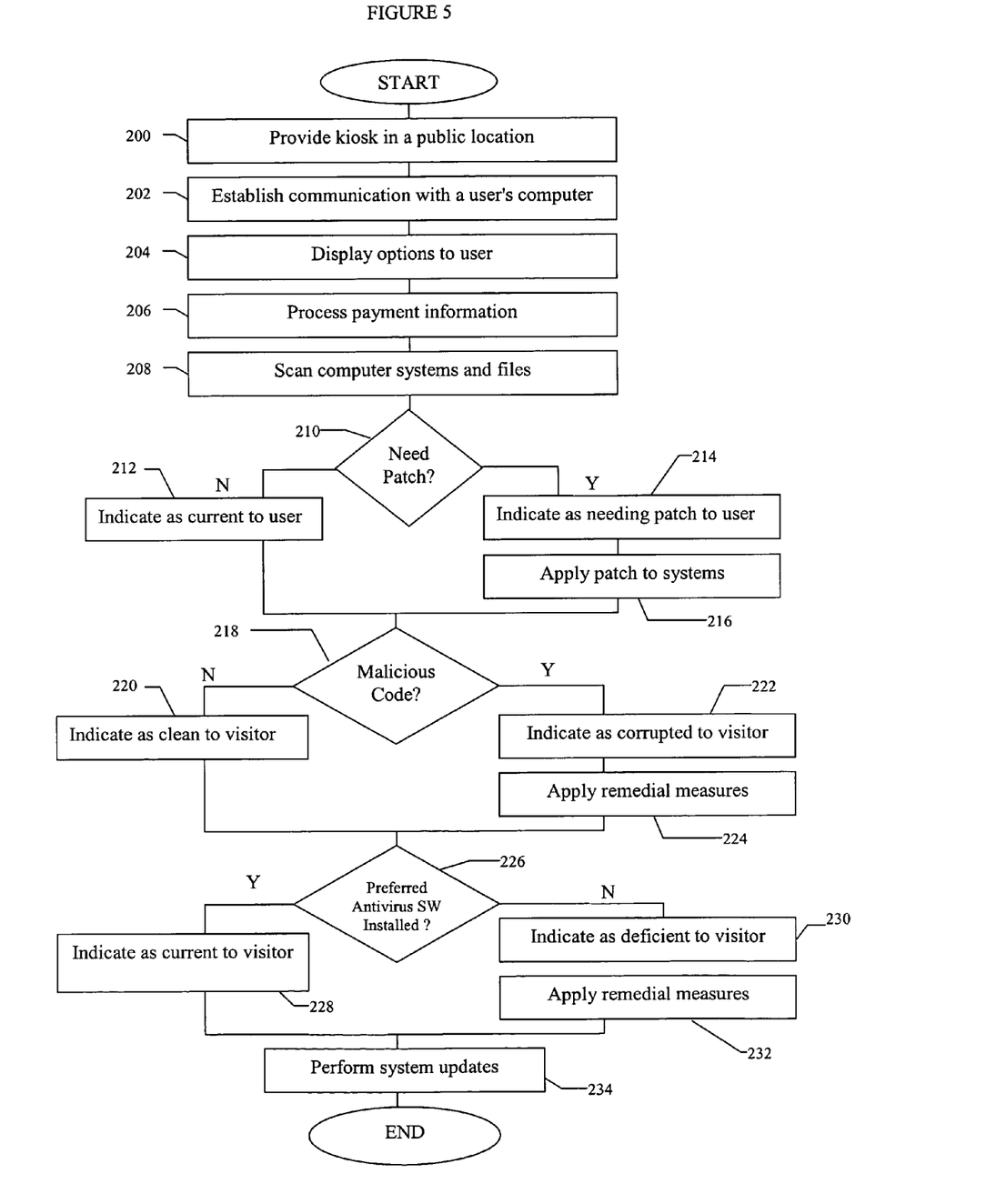
FIG. 5 illustrates a flow chart describing an example method for performing security verification tests on a computer in accordance with the present invention.

FIG. 5 illustrates a flow chart describing an example method for performing security verification tests on a computer in accordance with the present invention. The method described herein may be carried out using computer software, as can any or all of the processes described herein. That software may be executed by security verification station 44, gateway server 48, network element 46, kiosk 50, computer 10, or any other computer or combination of computers. The method of FIG. 5 can also be used to upgrade software applications to a preferred version. The preferred version may be that which is most recently available, that which is required by an enterprise network 42, or that which is required or suggested by a provider of the software application.

At step 200, a kiosk 50 is provided in a public location. For example, kiosk 50 may be located in an airport, shopping center, retail establishment, or other public forum. In such embodiments, kiosk 50 may be used to perform various security verification tests on the user's computer. Thus, kiosk 50 may be used to perform security patch analyses to verify that the applications and/or systems on the user's computer have been installed with the latest software upgrades or security patches. Additionally, kiosk 50 may be used to perform antivirus scans to identify, detect, and, in some cases, remedy any files or systems that are corrupted with viruses, worms, or other malicious code. Kiosk 50 may also be used to perform security practice assessments to determine whether any systems on the computer employ unsafe security practices.

As just one example, a user waiting for an airplane at an airport might desire to upgrade his computer's operating system. The user might desire to download the latest security patches for the computer's Microsoft Windows operating system. The user might also wish to scan various files and emails stored on the computer to determine if any of the files or emails are corrupted. In other embodiments, kiosk 50 may be located at an access point to an enterprise facility. In such embodiments, kiosk 50 may perform security verification tests similar to those described above in an effort to restrict a user's access to an enterprise network 42.

At step 202, communication between kiosk 50 and a user's computer is established. In particular embodiments, kiosk 50 may include a port or other connectable device that may be coupled to a port of the user's computer. Alternatively, where the user's computer is enabled for wireless communication, kiosk 50 may include a wireless router (or other wireless connection) for establishing a wireless communication path with appropriate hardware and software of the user's computer.

At step 204, kiosk 50 may display one or more security verification options to the user. The options may be displayed on display 56 or on the graphical interface screen of the user's computer. The displayed options may include a variety of security verification tests (or other tests) from which the user may choose. In particular embodiments, the options may include security patch analyses, software installments or upgrades, antivirus scans, security practices assessments, and any other processes for improving the security and health of the user's computer. Although kiosk 50 may offer all of these options to the user, it is recognized that kiosk 50 may offer any one of these or other security verification tests and may offer any combination of the same.

At step 206, payment information may be received and processed. Accordingly, kiosk 50 may have equipment for obtaining and processing credit card information or other payment information (e.g., debit card, ATM card, or smart card information) from the user. For example, kiosk 50 may have a credit card swipe or slot that reads payment information from the user's credit card. The kiosk 50 may then be capable of authenticating the credit card information over a telephone line, public network, or private network to verify that payment has been obtained. The payment step could occur later without departing from the scope of the invention.

At step 208, the computer's systems and files are scanned. As a result of the scan, a determination may be made, at step 210, as to whether the user's computer needs one or more security or file patches. To this end, kiosk 50 may perform a security patch analysis (or current software version analysis) by scanning and analyzing the operating or other systems or applications on the user's computer. The scan may be performed to determine if the computer has the preferred software. The security patch analysis may be performed by querying the computer's operating system for specific information about the version of the software supporting the operating system. Additionally or alternatively, kiosk 50 may query the computer's operating system to identify a time stamp or date stamp that is associated with the software supporting the operating system. In other embodiments, the operating system may accept commands eliciting information about what patches are installed. Accordingly, the operating system may respond to such commands by providing kiosk 50 with a list of the patches installed. Similar functionality may be provided for various software applications. This step could also include a scan for malicious code and/or remedying of a malicious code issue with any of the options described above.

In addition to determining whether the user's computer needs one or more patches, kiosk 50 may query the computer to determine whether the computer employs any unsafe security practices as described above.

If the security verification tests performed at step 210 indicate that the user's computer does not need a security patch, this is indicated to the user at step 212. The indication to the user may be made using pass/fail indicator 60 or by displaying a message to the user on display 56 or the graphical interface screen of the user's computer. On the other hand, if the security verification tests performed at step 210 indicate that the user's computer needs a security patch, this need is indicated to the user at step 214. The indication may also be made using pass/fail indicator 60, display 56, or the graphical interface screen of the user's computer.

At step 216, the necessary patches are applied to the computer's systems or files. For example, where kiosk 50 has determined that a file supporting the operating system is outdated, the outdated file or portion of code may be replaced with a newer version. At step 218, a determination may be made as to whether the visitor's computer includes one or more malicious code items. The determination may be made by performing an antivirus scan on the files stored on the user's computer to identify malicious code items associated with the files. Where present, the malicious code items may indicate that one or more files on the user's computer are corrupted with a virus, worm, or other malicious code. The performance of the antivirus scan may improve the general health of the user's computer and deter the spread of malicious code to other computing devices and systems. The malicious code scan could be performed before the scan of step 208 or in conjunction therewith without departing from the scope of the invention.

If it is determined that the user's computer is not corrupted with malicious code items, the method proceeds to step 220 where the fact that the computer is clean may be indicated to the user. For example, pass/fail indicator 60 may flash or display an appropriate color identifying that the tested computer is free of worms, viruses, and other malicious code. Alternatively or additionally, the message may be conveyed to the user on display 56 or the graphical interface screen of the user's computer. If the antivirus scan performed at step 216 indicates that the user's computer has one or more malicious code items, however, the fact that the computer includes corrupted files is indicated to the user at step 222. For example, pass/fail indicator 60 may flash or display an appropriate color identifying that a problem has been identified with the tested computer. Alternatively or additionally, the message may be conveyed to the user on display 56 or the graphical interface screen of the user's computer.

At step 224, remedial measures may be applied to the user's computer if the user selected that option at step 204 For example, kiosk 50 may remove the one or more corrupted files from the visitor's computer. Alternatively, kiosk 50 may clean the one or more corrupted files by removing the malicious code items. Although the steps of offering and applying remedial measures are described, it is generally recognized that step 224 may be omitted. Thus, the method may merely include the identification of corrupted files and systems. Where such remedial measures are not offered or are not accepted by the visitor and the computer is identified as having a malicious code or virus, however, the user may utilize other remedial systems to repair the corrupted files or systems.

At step 226, a determination is made as to whether a preferred antivirus software is installed on the computer. In particular embodiments, a scan of the computer's programs and systems may be performed to determine whether the preferred antivirus software is installed on the computer. Where such a program is identified, version information associated with the antivirus software may be obtained to determine if the software is a preferred antivirus software. The version information may be compared with version information associated with the latest version available or a preferred version.

Where preferred version is identified as already being installed on the computer, a further determination may be made to identify whether the virus information associated with the preferred version is up to date. Because viruses and other malicious code typically have a short lifespan before they are discovered and can be adequately guarded against, antivirus applications typically include signature files or .dat files that identify the viruses and other malicious code for which the antivirus application will search on a computer. As new malicious codes are identified as being in circulation, the signature files and .dat files associated with antivirus applications must be updated to include the new malicious codes. Accordingly, step 226 may include the performance of an updating procedure for the signature and .dat files on the tested computer.

If it is determined that the user's computer includes updated antivirus software, the method proceeds to step 228 where the fact that the computer's systems are up to date may be indicated to the user. For example, pass/fail indicator 60 may flash or display an appropriate color identifying that the tested computer includes the preferred antivirus software. Alternatively or additionally, the message may be conveyed to the user on display 56 or the graphical interface screen of the user's computer. If it is determined at step 226 that the user's computer does not include the preferred antivirus software, however, the fact that the computer is deficient is indicated to the user at step 230. For example, pass/fail indicator 60 may flash or display an appropriate color identifying that a problem has been identified with the tested computer. Alternatively or additionally, the message may be conveyed to the user on display 56 or the graphical interface screen of the user's computer.

At step 232, remedial measures may be applied to the user's computer if the user selected that option at step 204 For example, where the user's computer is identified as not having the preferred antivirus software stored on the computer, kiosk 50 may install the preferred antivirus software program on the computer. Alternatively, where the user's computer is identified as having an outdated version of the preferred antivirus software, kiosk 50 may apply one or more patches or upgrades to the computer's existing antivirus software.

In particular embodiments, the programs and system patches stored in kiosk 50 may be periodically updated at step 234. Similarly, the viruses known to the antivirus scan may be periodically updated such that kiosk 50 may diagnose and remedy recently released viruses, worms, and other malicious code. For example, the signature files or .dat files identifying harmful malicious codes that are searched for by the kiosk's antivirus software application may be updated or replaced. To receive such an update, kiosk 50 may communicate with a public network such as the Internet to download the latest versions of antivirus software, security patches, and information about the latest viruses, worms, and other malicious code. In other embodiments, a hard drive or other memory or database may be updated manually. Thus, the hard drive with kiosk 50 may be replaced, or new files may be saved to the system. As a result of the periodic updating, kiosk 50 may be able to clean or protect a computer from the latest version of malicious code that is being used to interfere with the normal operation of computing systems. Additionally, and in particular embodiments, kiosk 50 may be able to offer the latest antivirus software available for downloading to the computer.

Although the present invention has been described in detail, it should be understood that various changes, substitutions and alterations can be made hereto without departing from the sphere and scope of the invention as defined by the appended claims. For example, the steps described with regard to FIGS. 4 and 5 are merely provided as example methods for performing the functionality described. It is recognized that the methods may be performed using any combination of the steps described together with any other appropriate steps for restricting access to an enterprise network or maintaining the general health of a computing system. Furthermore, it is recognized that the steps may be performed in any order without departing from the intended scope of the invention.

To aid the Patent Office, and any readers of any patent issued on this application in interpreting the claims appended hereto, applicants wish to note that they do not intend any of the appended claims to invoke ¶ 6 of 35 U.S.C. § 112 as it exists on the date of filing hereof unless "means for" or "step for" are used in the particular claim.

What is claimed is:

1. A method for determining whether a computer has one or more malicious code items, comprising:
    determining whether a computer that may be connected to an enterprise network on a temporary basis has one or more malicious code items, the computer accompanying a visitor to a facility associated with the enterprise network;
    providing an indication to a human if it is determined that the computer has one or more malicious code items;
    printing a label to adhere to the computer to identify the computer as having passed an inspection for malicious code items.

2. The method of claim 1, wherein determining whether the computer has one or more malicious code items comprises performing a scan of one or more files or systems on the computer to identify a virus, worm, or other malicious code item.

3. The method of claim 1, further comprising:
    determining whether code associated with one or more programs running on the computer is of a preferred version; and
    applying a patch to the code if it is determined that the code is not the preferred version, the patch applied to replace a portion of the code.

4. The method of claim 3, further comprising:
    receiving version information associated with the code from the computer; and
    comparing the version information to information associated with the preferred version.

5. The method of claim 4, wherein the code comprises an antivirus software application.

6. The method of claim 1, further comprising establishing a communication path between the computer and a security verification station associated with the enterprise network.

7. The method of claim 6, wherein the security verification station is located in the facility associated with the enterprise network.

8. The method of claim 6, wherein the security verification station comprises a kiosk located in the facility associated with the enterprise network.

9. The method of claim 6, wherein establishing a communication path between the computer and the security verification station comprises coupling a port of the security verification station to a port of the computer.

10. The method of claim 6, wherein establishing a communication path between the computer and the security verification station comprises establishing a wireless communication path between the computer and the security verification station.

11. The method of claim 1, further comprising:
associating an identifier with the computer, the identifier indicating whether or not the determining step identified one or more malicious code items;
communicating the identifier from the security verification station to the enterprise network over a communication path; and
storing the identifier in a database associated with the enterprise network.

12. The method of claim 1, further comprising providing a digital certificate to the computer, the digital certificate indicating whether or not the determining step identified one or more malicious code items.

13. The method of claim 1, further comprising indicating to a user that the computer is corrupted if the determining step identified one or more malicious code items.

14. The method of claim 1, further comprising applying a remedial measure to the computer if the determining step identified one or more malicious code items.

15. The method of claim 14, wherein applying the remedial measure comprises removing a file associated with a malicious code from the computer.

16. The method of claim 14, further comprising receiving payment information from a user associated with the computer before applying the remedial measure.

17. The method of claim 1, further comprising performing a security practices assessment to determine whether the computer is vulnerable to one or more malicious code items.

18. A method for determining whether a computer has one or more malicious code items, comprising:
determining whether a computer that may be connected to an enterprise network on a temporary basis has one or more malicious code items, the computer accompanying a visitor to a facility associated with the enterprise network;
providing an indication to a human if it is determined that the computer has one or more malicious code items; and
printing a label to adhere to the computer to identify the computer as having failed an inspection for malicious code items.

19. The method of claim 18, wherein determining whether the computer has one or more malicious code items comprises performing a scan of one or more files or systems on the computer to identify a virus, worm, or other malicious code item.

20. The method of claim 18, further comprising:
determining whether code associated with one or more programs running on the computer is of a preferred version; and
applying a patch to the code if it is determined that the code is not the preferred version, the patch applied to replace a portion of the code.

21. The method of claim 20, further comprising:
receiving version information associated with the code from the computer; and
comparing the version information to information associated with the preferred version.

22. The method of claim 21, wherein the code comprises an antivirus software application.

23. The method of claim 18, further comprising establishing a communication path between the computer and a security verification station associated with the enterprise network.

24. The method of claim 23, wherein the security verification station is located in the facility associated with the enterprise network.

25. The method of claim 23, wherein the security verification station comprises a stand-alone device that is isolated from the enterprise network.

26. The method of claim 23, wherein the security verification station comprises a kiosk located in the facility associated with the enterprise network.

27. The method of claim 23, wherein establishing a communication path between the computer and the security verification station comprises coupling a port of the security verification station to a port of the computer.

28. The method of claim 23, wherein establishing a communication path between the computer and the security verification station comprises establishing a wireless communication path between the computer and the security verification station.

29. The method of claim 18, further comprising:
associating an identifier with the computer, the identifier indicating whether or not the determining step identified one or more malicious code items;
communicating the identifier from the security verification station to the enterprise network over a communication path; and
storing the identifier in a database associated with the enterprise network.

30. The method of claim 18, further comprising providing a digital certificate to the computer, the digital certificate indicating whether or not the determining step identified one or more malicious code items.

31. The method of claim 18, further comprising indicating to a user that the computer is corrupted if the determining step identified one or more malicious code items.

32. The method of claim 18, further comprising adhering the label to a port of the computer to make it more difficult to access the enterprise network using the computer.

33. The method of claim 18, further comprising placing a lock on a port of the computer to make it more difficult to access the enterprise network using the computer.

34. The method of claim 18, further comprising applying a remedial measure to the computer if the determining step identified one or more malicious code items.

35. The method of claim 34, wherein applying the remedial measure comprises removing a file associated with a malicious code from the computer.

36. The method of claim 34, further comprising receiving payment information from a user associated with the computer before applying the remedial measure.

37. The method of claim 18, further comprising performing a security practices assessment to determine whether the computer is vulnerable to one or more malicious code items.

38. A system for determining whether a computer has one or more malicious code items, comprising:
an enterprise network; and
a security verification station associated with the enterprise network, the security verification station at least partially isolated from the enterprise network and operable to:
determine whether a computer that may be connected to the enterprise network on a temporary basis has one or more malicious code items, the computer accompanying a visitor to a facility associated with the enterprise network;
provide an indication to a human if it is determined that the computer has one or more malicious code items; and print a label to adhere to the computer to identify the computer as having passed an inspection for malicious code items.

39. The system of claim 38, wherein the security verification station is operable to perform a scan of one or more files or systems on the computer to identify a virus, worm, or other malicious code item.

40. The system of claim 38, wherein the security verification station is operable to:
determine whether code associated with one or more programs running on the computer is a preferred version; and
apply a patch to the code if it is determined that the code is not the preferred version, the patch applied to replace a portion of the code.

41. The system of claim 40, wherein the security verification station is further operable to:
receive version information associated with the code from the computer; and
compare the version information to information associated with the preferred version.

42. The system of claim 41, wherein the code comprises an antivirus software application.

43. The system of claim 38, wherein the security verification station is operable to establish a communication path between the computer and a security verification station associated with the enterprise network.

44. The system of claim 43, wherein the security verification station is located in the facility associated with the enterprise network.

45. The system of claim 43, wherein the security verification station comprises a kiosk located in the facility associated with the enterprise network.

46. The system of claim 43, wherein a port of the security verification station is operable to couple to a port of the computer to establish a communication path between the computer and the security verification station.

47. The system of claim 43, wherein the security verification station is operable to establish a wireless communication path between the computer and the security verification station.

48. The system of claim 38, wherein the security verification station is further operable to:
associate an identifier with the computer, the identifier indicating whether or not the security verification station determined that the computer has one or more malicious code items;
communicate the identifier from the security verification station to the enterprise network over a communication path; and
store the identifier in a database associated with the enterprise network.

49. The system of claim 38, wherein the security verification station is further operable to provide a digital certificate to the computer, the digital certificate indicating whether or not the security verification station determined that the computer has one or more malicious code items.

50. The system of claim 38, wherein the security verification station is further operable to indicate to a user that the computer is corrupted if the security verification station determined that the computer has one or more malicious codes.

51. The system of claim 38, wherein the security verification station is further operable to apply a remedial measure to the computer if the security verification station determined that the computer has one or more malicious code items.

52. The system of claim 51, wherein, when applying the remedial measure, the security verification station is further operable to remove a file associated with a malicious code from the computer.

53. The system of claim 51, wherein the security verification station is further operable to receive payment information from a user associated with the computer before applying the remedial measure.

54. The system of claim 38, wherein the security verification station is further operable to perform a security practices assessment to determine whether the computer is vulnerable to one or more malicious code items.

55. A system for determining whether a computer has one or more malicious code items, comprising:
an enterprise network; and
a security verification station associated with the enterprise network, the security verification station at least partially isolated from the enterprise network and operable to:
determine whether a computer that may be connected to the enterprise network on a temporary basis has one or more malicious code items, the computer accompanying a visitor to a facility associated with the enterprise network;
provide an indication to a human if it is determined that the computer has one or more malicious code items; and
print a label to adhere to the computer to identify the computer as having failed an inspection for malicious code items.

56. The system of claim 55, wherein the security verification station is operable to perform a scan of one or more files or systems on the computer to identify a virus, worm, or other malicious code item.

57. The system of claim 55, wherein the security verification station is operable to:
determine whether code associated with one or more programs running on the computer is a preferred version; and
apply a patch to the code if it is determined that the code is not the preferred version, the patch applied to replace a portion of the code.

58. The system of claim 57, wherein the security verification station is further operable to:
receive version information associated with the code from the computer; and
compare the version information to information associated with the preferred version.

59. The system of claim 58, wherein the code comprises an antivirus software application.

60. The system of claim 55, wherein the security verification station is operable to establish a communication path between the computer and a security verification station associated with the enterprise network.

61. The system of claim 60, wherein the security verification station is located in the facility associated with the enterprise network.

62. The system of claim 60, wherein the security verification station comprises a stand-alone device that is isolated from the enterprise network.

63. The system of claim 60, wherein the security verification station comprises a kiosk located in the facility associated with the enterprise network.

64. The system of claim 60, wherein a port of the security verification station is operable to couple to a port of the computer to establish a communication path between the computer and the security verification station.

65. The system of claim 60, wherein the security verification station is operable to establish a wireless communication path between the computer and the security verification station.

66. The system of claim 55, wherein the security verification station is further operable to:
- associate an identifier with the computer, the identifier indicating whether or not the security verification station determined that the computer has one or more malicious code items;
- communicate the identifier from the security verification station to the enterprise network over a communication path; and
- store the identifier in a database associated with the enterprise network.

67. The system of claim 55, wherein the security verification station is further operable to provide a digital certificate to the computer, the digital certificate indicating whether or not the security verification station determined that the computer has one or more malicious code items.

68. The system of claim 55, wherein the security verification station is further operable to indicate to a user that the computer is corrupted if the security verification station determined that the computer has one or more malicious codes.

69. The system of claim 55, wherein the label is adapted to be adhered to a port of the computer to make it more difficult to access the enterprise network using the computer.

70. The system of claim 55, wherein the security verification station is further operable to place a lock on a port of the computer to make it more difficult to access the enterprise network using the computer.

71. The system of claim 55, wherein the security verification station is further operable to apply a remedial measure to the computer if the security verification station determined that the computer has one or more malicious code items.

72. The system of claim 71, wherein, when applying the remedial measure, the security verification station is further operable to remove a file associated with a malicious code from the computer.

73. The system of claim 71, wherein the security verification station is further operable to receive payment information from a user associated with the computer before applying the remedial measure.

74. The system of claim 55, wherein the security verification station is further operable to perform a security practices assessment to determine whether the computer is vulnerable to one or more malicious code items.

* * * * *